(12) United States Patent
Lucet et al.

(10) Patent No.: US 8,158,723 B2
(45) Date of Patent: Apr. 17, 2012

(54) MOISTURE CROSS-LINKABLE ADHESIVE COMPOSITIONS

(75) Inventors: Virginie Lucet, Moncourt Fromonville (FR); Jacqueline Carrard, Brie Comte Robert (FR); André Mayer, Bius ke Roi (FR)

(73) Assignee: Bostik, S.A., Paris la Defense Cedex (FR)

( * ) Notice: Subject to any disclaimer, the term of this patent is extended or adjusted under 35 U.S.C. 154(b) by 661 days.

(21) Appl. No.: 10/596,408

(22) PCT Filed: Dec. 2, 2004

(86) PCT No.: PCT/FR2004/003097
§ 371 (c)(1),
(2), (4) Date: Jan. 10, 2007

(87) PCT Pub. No.: WO2005/066283
PCT Pub. Date: Jul. 21, 2005

(65) Prior Publication Data
US 2007/0219311 A1 Sep. 20, 2007

(30) Foreign Application Priority Data
Dec. 11, 2003 (FR) .................................... 03 14507

(51) Int. Cl.
*C08L 83/00* (2006.01)

(52) U.S. Cl. ....................... 525/100; 525/101; 525/104

(58) Field of Classification Search .................. 525/100, 525/101, 104
See application file for complete search history.

(56) References Cited

U.S. PATENT DOCUMENTS

| | | | | | |
|---|---|---|---|---|---|
| 3,441,534 | A | * | 4/1969 | Knaub | 524/860 |
| 4,082,896 | A | * | 4/1978 | Wegwerth | 428/413 |
| 4,714,738 | A | * | 12/1987 | Chang et al. | 525/58 |
| 5,250,607 | A | * | 10/1993 | Comert et al. | 524/507 |
| 5,767,197 | A | * | 6/1998 | Fukatsu et al. | 525/101 |
| 6,552,118 | B2 | * | 4/2003 | Fujita et al. | 524/588 |
| 7,365,145 | B2 | * | 4/2008 | Yang et al. | 528/29 |
| 2004/0092640 | A1 | | 5/2004 | Makino et al. | |
| 2004/0180155 | A1 | * | 9/2004 | Nguyen-Misra et al. | 428/34 |

FOREIGN PATENT DOCUMENTS

| | | | |
|---|---|---|---|
| EP | 0 732 348 A1 | | 9/1996 |
| JP | 2002069288 | * | 3/2002 |
| JP | 200269288 | | 9/2003 |
| WO | WO 02/072724 A1 | | 9/2002 |

* cited by examiner

Primary Examiner — Bernard Lipman
(74) Attorney, Agent, or Firm — Hunton & Williams, LLP

(57) ABSTRACT

The invention relates to a moisture cross-linkable composition usable as an adhesive or sealant which is very easy to use and exhibits excellent bonding performance.
The composition is obtained by mixing 100 parts by weight of an organic polymer (A) with moisture cross-linkable reactive silane terminal functions and 1 to 70 parts by weight of an organic polymer (B) miscible at ambient temperature with polymer (A), selected from among polyesters, polyethers, polyurethanes, polyacrylates, polyethylenediimines, polycarbonates, polyureas or polyamides.

18 Claims, No Drawings

MOISTURE CROSS-LINKABLE ADHESIVE COMPOSITIONS

The present invention relates to a moisture cross-linkable composition usable as an adhesive or sealant which is very easy to use and exhibits excellent bonding performance.

PRIOR ART

The ultimate performance of a bonded joint and the processing characteristics of the adhesive on the substrates to be assembled by adhesive bonding are the major factors involved in selecting an adhesive.

The ultimate performance of the adhesive is for example adapted to the anticipated mechanical stresses for the bonded substrates or parts. The processing characteristics of an adhesive also essentially determine its ease of use.

Processing characteristics of an adhesive which may be mentioned include:
 tack (or stickiness), which corresponds to the initial adhesive strength once the adhesive has been applied onto one or both of the two substrates to be assembled and the two substrates have been brought into contact;
 maximum open time, which is the period of time after which a layer of adhesive applied to a substrate loses its ability to bond adhesively said substrate to another substrate.

For many uses, a long maximum open time is particularly advantageous, for example for manual applications, for bonding large or complicated parts, because it makes it easy to position the parts and optionally to reposition them while simultaneously ensuring optimum adhesive performance. Similarly, sufficiently high tack (or stickiness) may frequently make it possible to avoid having to use auxiliary clamping means.

Environmental impact is another characteristic of adhesives which is becoming increasingly important. For example, solvent-based elastomeric adhesives, such as neoprene adhesives, were initially used for "contact" adhesives. Today, national, European and international regulations require a reduction in solvent emissions. Consequently, the presence of organic solvents is today a major drawback. "Hot melt" adhesives have been proposed to avoid this drawback, but, while effective, these adhesives entail prior heating, which is a major disadvantage for the application thereof. Other attempts have been directed towards aqueous emulsion adhesives, but their processing characteristics are mediocre, in particular adhesion is low, setting time is long and, furthermore, they can only be applied onto substrates which absorb water.

Work was then carried out to provide reactive adhesives, comprising neither solvent nor water to be eliminated, which undergo moisture cross-linking at ambient temperature. Among the reactive functions used, adhesives with terminal isocyanate functions (or derivatives) were initially used, but these adhesives contain proportions of monomers which are harmful to a greater or lesser extent and may furthermore be converted into aromatic amines under the action of moisture. These latter compounds may exhibit toxic properties in some cases.

Polymers with silane reactive terminal groups were then used in many compositions for adhesives or sealants. For example, the Japanese company Kanegafuchi (frequently known as KANEKA) has filed many patents describing polymers of the polyether or polyester type with silane terminal groups, for example FR 2,430,439 and EP 0 264 072. Polyurethane polymer-based compositions with silane terminal groups have also been suggested, in particular in U.S. Pat. No. 5,298,572 or patent EP 0 549 627. However, the compositions so described do not properly fulfill the above-stated criteria for usage.

More recently, patent EP 0 732 348 has described an improvement in the characteristics of ambient temperature moisture cross-linkable adhesives by adding to the reactive polymer with silane terminal groups particles of an amorphous powder of a small particle size, which powder may be composed of acrylate type polymers. These insoluble powders are dispersed within the reactive polymer. However, the tack of this type of adhesive composition is low, and the substrates coated with adhesive must be left to stand for an extended period before being brought into contact.

Patent EP 1 057 866 describes a silanized polymer composition for contact adhesives having a long maximum open time, but the substrates to which the adhesive has been applied must again be left to stand for a certain time without contact if sufficient tack to grab the substrates is to develop.

PROBLEM

Improvements accordingly still remain to be made to ambient temperature moisture cross-linkable adhesive compositions in order, on the one hand, to impart to the bonded joint (obtained once the adhesive compositions have been applied onto the substrate(s) to be assembled and once the latter have been brought into contact) performance (in particular ultimate adhesive strength) which is at least equivalent to that of prior art adhesives, and, on the other hand, to obtain improved processing characteristics.

After considerable research, the applicant has discovered that it is possible to obtain ambient temperature moisture cross-linkable adhesive compositions with polymers having silane terminal groups, the application properties of which are improved relative to the prior art.

The compositions of the invention make it possible to achieve an excellent level of ultimate adhesive strength while still exhibiting the following improved processing characteristics: elevated tack facilitating immediate grab of the two substrates without auxiliary holding means, and maximum open times which are substantially greater than those found in the prior art.

The present invention provides an adhesive composition obtained by mixing:
 100 parts by weight of at least one organic polymer (A) having moisture cross-linkable reactive silane terminal functions, and
 1 to 70 parts by weight of at least one organic polymer (B) comprising no reactive silane functions which is miscible at ambient temperature with polymer (A), and is selected from among polyesters, polyethers, polyurethanes, polyacrylates, polyethylenediimines, polycarbonates, polyureas or polyamides.

In the present text, unless otherwise stated, all quantities stated in parts are quantities by weight.

The organic polymer (A) is generally selected from among the following polymer chains:
 (1) homopolymers and copolymers obtained from:
  at least one monomer of the alkyl (meth)acrylate type comprising an alkyl radical having between 1 and 15, preferably between 1 and 10, carbon atoms; and optionally
  other monomers, such as styrene derivatives, vinyl ethers, (meth)acrylic acids or other polyunsaturated derivatives, it being possible to use these other monomers in contents of up to 50% by weight relative to the combined total of the monomers. These other monomers are for example such as those described in U.S. Pat. No. 4,593,068. The mean molecular mass of these polymers is for example between 5000 and 100,000;

(2) polyoxyalkylenes (or polyethers) of molecular masses of between 500 and 30,000, preferably between 3000 and 15,000, and in particular polyoxyethylenes and polyoxypropylenes;

(3) polyurethanes obtained by condensation of a polyol (in particular of the polyether and/or polyester type) with polyisocyanates. The molecular masses are generally between 1000 and 30,000.

Polymers with moisture cross-linkable reactive silane terminal functions are taken to mean polymers comprising at least one hydrolyzable silicon-containing group, the hydrolyzable silicon-containing group preferably being a silyl group of the formula:

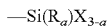

in which:

a is an integer from 0 to 2,

R is a monovalent hydrocarbon radical and

X is a hydrolyzable radical.

Examples of the hydrolyzable radical are the hydride radical, the hydroxy radical, the acyloxy radical, the ketoxime radical, the aminoxy radical, the amide radical, the acid amine radical, etc., the alkoxy radical being specially preferred.

Non-limiting examples of polymers (A) which may be mentioned are:

(meth)acrylic copolymers such as those described in U.S. Pat. No. 4,171,914, U.S. Pat. No. 4,910,255, U.S. Pat. No. 6,441,101, U.S. Pat. No. 6,420,492, EP 1 153 942, and patent EP 0 199 445, polyethers such as those described in patent applications or U.S. Pat. Nos. 3,971,751, 3,979,384, 4,323,488, EP 1 038 901, JP 2002 56458, U.S. Pat. No. 4,618,656, polyurethanes such as those described in patent applications or patents EP 1 178 069, U.S. Pat. No. 5,298,572, EP 0 714 925, EP 0 770 633, EP 0 601 021 and WO9533784.

Organic polymer (B) is miscible at ambient temperature in polymer (A). Miscible at ambient temperature is taken to mean either immediate solubility of (B) in (A) at 20° C., or solubility obtained after heating and cooling of the mixture, obtained by mixing (B) in (A), said mixture being heated at a suitable temperature generally of between ambient temperature and a temperature of the order of 90° C.

Miscibility of polymer (B) in polymer (A) may be total or partial. Partial is taken to mean that there may be a maximum content of (B) in (A), said content possibly varying as a function of the chemical nature and the molar mass of (B) in conjunction with the chemical nature of (A) and the molar mass thereof. The person skilled in the art can very straightforwardly establish this limit by carrying out mixing tests of polymer (A) with different additions of polymer (B) and monitoring the stability of the mixtures, for example, by means of the miscibility test described in the present application.

Polymers (B) which are usable in the adhesive composition according to the invention include in particular polyesters and polyurethanes. Usable polymers are more particularly polyesters based on polyether diol, polyester diol, caprolactone diol or any other type of diol or diacid, and polyurethanes based on polyether diol, polyester diol or any other type of diol.

According to one preferred variant of the invention, the organic polymer (B) is selected from among polyesters, polyurethanes and polyethylenediimines.

Polymer (B) may be amorphous or crystalline. It is preferably at least partially crystalline. Partially crystalline is taken to mean a polymer having a melting enthalpy, measured by Differential Scanning Calorimetry (DSC) between −40 and +100° C., of between 10 and 150 millijoules/mg. The crystallinity of polymer (B) may also be observed under a polarizing microscope.

When, in accordance with the above preferred variant, polymer (B) is at least partially crystalline, the mixing temperature for (B) in polymer (A) is advantageously selected at a temperature which is 10 to 20° C. higher than the melting temperature of polymer (B).

Polymer (B) generally has a mean molecular mass of between 500 and 1,000,000, preferably between 2000 and 100,000, and more preferably between 2500 and 50,000.

The preferred quantity of polymer (B) in the adhesive composition according to the invention is between 3 and 50 parts (per 100 parts of (A)).

The composition optionally comprises an inorganic filler such as those generally used in solvent-free, moisture cross-linking reactive adhesives. This filler is composed of particles. Examples of such fillers which may be mentioned are pyrogenic silica, titanium oxide or modified carbonates. The quantity of inorganic filler added is primarily determined by the final application. For example, for a conventional adhesive, this amount is generally between 0 and 10 parts, while for a sealant type adhesive, it may be between 50 and 200 parts.

Furthermore, additives conventionally used in this type of adhesive composition, such as cross-linking catalysts, plasticizers, adhesion promoters or stabilizers etc., may be added to the composition of the invention. The added quantity of additives, other than inorganic fillers, generally amounts to a few parts, for example from 1 to 5 parts for each additive.

The following examples which illustrate the invention are given in a non-limiting manner.

In these examples, the processing characteristics of the adhesive compositions and the ultimate performance of the bonded joint are evaluated by carrying out a series of tests.

Ultimate adhesion performance (or performance of the bonded joint) are determined by shear and peel tests on various substrates. These tests are described below:

The shear test is carried out in accordance with Standard NF EN 1465 (T 76-107) (February 1995). Breaking load is stated in daN/cm².

The peel test is carried out in accordance with Standard NF EN 28510-2 (September 1993). Breaking load is stated in daN/cm².

The appearance of the bonded joint is also stated under the heading: "film appearance".

Processing characteristics are determined by tests which measure tack (namely the "suction cup effect" test), creep and maximum open time.

Suction Cup Effect Test

A small flat earthenware tile of dimensions 10.5×10.5×0.7 cm is used which comprises a metal hook attached to the porous side of the tile, this assembly weighing 350 g. A large flat earthenware tile of dimensions 20×15×0.5 cm is also used.

A 0.5 cm diameter bead of adhesive is applied onto the smooth side of the small tile, parallel to and 3 cm away from the edge and a second bead is also applied parallel to and 7 cm away from this same edge. The small tile with the adhesive applied in this manner is immediately applied against the large tile, the smooth sides one against the other. The assembly is placed on the work surface, the small tile on top, and is held in place for 30 seconds by means of a 2 kg weight.

The assembly is then rotated by 180° and is placed horizontally on a support which is solely in contact with the large tile, such that the small tile is at a height of approximately 20 cm above the work surface, held on the large tile solely by the bonded joints.

Every 2 minutes, a 200 g weight is added to the metal hook on the small tile.

The suction cup effect corresponds to the immediate grab of the substrate under the action of initial cohesion. It is evaluated by the weight which must be added before the small tile falls as a result of becoming debonded.

The result is quantified by a rating ranging from 1 (poor result) to 10 (good result).

Creep Test

Slippage of the adhesive on a smooth glass wall arranged either vertically or at a predetermined angle is determined.

A large sheet of glass (40×40 cm) and small 10 g sheets of glass (7.5×7.5×0.1 cm) are used for this purpose. The small sheet is covered with a thin film (<0.5 mm) of adhesive, then the small sheet is stuck onto the large sheet in a horizontal orientation, and a 500 g weight is applied for 30 seconds. The large sheet is then arranged at a predetermined angle, for example 50°, and creep is checked and, if applicable, its extent, which makes it possible to rate the adhesive's performance from 1 to 10 (corresponding respectively to maximum creep and minimum creep).

Measurement of Maximum Open Time

The adhesive is simultaneously applied onto 6 small glass sheets with a spatula (application rate approximately 100 g/m$^2$). The adhesive coated sheets are then applied one after the other onto a glass substrate at 5 minute intervals. Adhesion of the small sheets onto the glass substrate is assessed manually 24 hours after drying. The maximum open time is the period of time beyond which adhesion no longer develops.

| | |
|---|---|
| rating 10 | maximum open time >30 minutes |
| rating 5 | maximum open time of 15 minutes |
| rating 1 | maximum open time of the order of 5 minutes |

Mixture Miscibility Test

Place 100 g of each prepared mixture into a sealed 150 ml glass jar. Leave to stand for 24 hours and record the appearance at a temperature of 20° C. Place in a refrigerator for one week at 5° C. Let the jar stand for 24 hours at 20° C. and record the appearance. Miscibility of the mixtures is assessed by the appearance of two liquid/liquid or liquid/solid phases characterized by settling or segregation.

Mixture Stability Test

Place 100 g of each formula to be tested into a sealed 150 ml glass jar. Place in an oven at 90° C. for one month. Remove the jars and stabilize them for 24 hours at 20° C. The stability of the mixture is rated 1 in the event of phase separation, 5 in the event of slight phase separation after one month and 10 in the event of stability after one month.

EXAMPLES

Sixteen adhesive compositions were prepared by using a planetary mixer to mix various components which may be assigned to three categories:

reactive polymers comprising moisture cross-linkable functions (polymers (A)), non-reactive polymers (polymers (B)), and inorganic filler and/or additives.

These compositions were prepared under the following conditions: mixing of the reactive polymer with the non-reactive polymer and the inorganic filler in a planetary type mixer. This mixture is then heated to 95° C. and kept under a vacuum of 10 mmHg for 2 hours. After cooling to 20° C., a methoxysiloxane type compound (adhesion promoter) and a catalyst are added.

The following polymers were used for the first category, the reactive polymers:

a mixture of silanized polyethers and silanized polyacrylates: MAX 602, product from Kaneka, a silanized polyether: SAX 350, SAX 720, product from Kaneka, silanized polyurethane: ST 55, product from HANSE Chemie, silanized polyurethane, BOSTIK FINDLEY: polyether-based polyurethane, Mw 4,000; silanized.

The following polymers were used for the second category, the non-reactive polymers:

polycaprolactone polyester: CAPA 6400 from SOLVAY, crystalline, molecular mass Mn: 37,000, crystalline polyester: DYNACOLL 7381 from Degussa; Mw 3,500, polycarbonate-based polyurethane: IROSTIC 7547, from SORAC, Mw not stated by supplier amorphous polyethylenediimine: LUPASOL P, from BASF; Mw 750,000, crystalline epoxy resin: EPIKOTE 1001, from Shell; Mw 700-1100, The following were used for the third category:

a reactive diluent: RD 359 from KANEKA, mixture of silanized polyethers and modified polyethers, a silica type inorganic filler: Aerosil 200, a gamma-2-aminoethylaminopropyltrimethoxysilane: Dynasilane 1146 from Degussa, a catalyst: dibutylbis(pentane-2'-dionato-O,O)Sn: U220 Neostann from Nitto Kasei Co. Ltd.

The precise content of the components present in each of these compositions is shown in Table 1, where the quantities are stated in parts by weight.

The miscibility and stability characteristics of the solution, assessed both in terms of homogeneity and color, of these compositions are shown in Table 2, which also comprises the processing characteristics of these compositions, namely initial tack, suction cup effect and creep, maximum open time and final appearance of the adhesive film.

Table 3 shows the performance of the compositions in terms of ultimate adhesive strength assessed by the shear and peel tests.

TABLE 1

| COMPONENTS | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| | | | | | | | COMPARATIVE EXAMPLES (7, 8, 10, 13, 14, 15) | | EXAMPLES (1–6, 9, 11, 12, 16) | | | | | | | |
| Reactive polymers | | | | | | | | | | | | | | | | |
| silanized polyether | | | 100 | 100 | | | | | | | | | | | | |
| silanized polyether/polyacrylic | 100 | 100 | | | 100 | 100 | 100 | 100 | 100 | 100 | 100 | 100 | | | | |
| silanized PU | | | | | | | | | | | | | | | 100 | 100 |
| silanized PU, Bostik Findley | | | | | | | | | | | | | 100 | 100 | | |
| Non-reactive polymers | | | | | | | | | | | | | | | | |
| polycaprolactone polyester, mol. mass >37,000 | | | | | 10 | | | | | | 1 | 50 | | | | 10 |
| polyester, mol. mass >3500 | | | | | | 10 | | | | | | | | | | |
| polycarbonate-based PU, mol. mass >750,000 | | | | | | | | 11 | | | | | | | | |
| amorphous polyethylenediimine, mol. mass >10,000 | | | | | | | | | 10 | | | | | | | |
| crystalline epoxy resin, 700-1100 | | | | | | | | | 0 | 10 | | | | | | |
| Additives | | | | | | | | | | | | | | | | |
| titanium inorganic filler | | | | | | | | | | | 200 | | | | | |
| silica inorganic filler | 10 | 5 | 10 | 10 | 5 | 5 | 5 | 5 | 5 | 5 | | 1 | 7 | 7 | 5 | 5 |
| plasticizer | 20 | | | | | | | | | | | | | | | |
| reactive diluent | | 5 | | | 5 | 5 | 5 | 3 | 5 | 5 | 20 | 10 | 3 | 3 | 5 | 6 |
| Dynasilane 1146 | 4 | 4 | 2.8 | 2.8 | 4 | 3.8 | 3.8 | 3 | 4 | 4 | 3 | 3 | 3.5 | 3.5 | 4 | 4 |
| dibutylbis(pentane-2'-dionato-O,O) tin | 1.5 | 1.4 | 1.6 | 1.6 | 1.4 | 1.5 | 1.5 | 1.5 | 1.5 | 1.5 | 1.5 | 1.5 | 0.75 | 0.2 | 1.5 | 1.5 |

TABLE 2

PROCESSING CHARACTERISTICS

| PERFORMANCE | 1 | 2 | 3 | 4 | 5 | 6 | 7 | 8 | 9 |
|---|---|---|---|---|---|---|---|---|---|
| | EXAMPLES (1–6, 9) / COMPARATIVE EXAMPLES (7, 8) | | | | | | | | |
| DISSOLUTION | very easy | very easy | very easy | easy | very easy | easy | easy, fluid | dissolution impossible | easy |
| SOLUTION STABILITY (after one month) | homogeneous | homogeneous | homogeneous | homogeneous | homogeneous | homogeneous | homogeneous | 2 phases | onset of phase sep. |
| SOLUTION STABILITY RATING | 10 | 10 | 10 | 10 | 10 | 10 | 5 | 1 | 10 |
| COLOR IN POT (after one month) | translucent yellowish | translucent colorless | translucent colorless | translucent yellowish | translucent colorless | translucent yellowish | translucent yellowish | x | opaque yellowish |
| FILM APPEARANCE | transparent | transparent | transparent | transparent | transparent | transparent | transparent | x | opaque yellowish |
| SUCTION CUP EFFECT, rating from 1 to 10 | 4 | 5 | 3 | 3 | 9 | 8 | 6 | 1 | 6 |
| CREEP TEST, rating from 1 to 10 | 4 | 5 | 4 | 4 | 10 | 8 | 6 | 1 | 7 |
| MAXIMUM OPEN TIME, rating from 1 to 10 | 7 | 6 | 5 | 5 | 9 | 8 | 7 | 1 | 8 |

| PERFORMANCE | 10 | 11 | 12 | 13 | 14 | 15 | 16 |
|---|---|---|---|---|---|---|---|
| | EXAMPLES (11, 12, 16) / COMPARATIVE EXAMPLES (10, 13, 14, 15) | | | | | | |
| DISSOLUTION | easy | easy | easy | good | good | easy | very easy |
| SOLUTION STABILITY (after one month) | phase sep.* | homogeneous | homogeneous | good | good | homogeneous | slight phase sep. |

TABLE 2-continued

| PROCESSING CHARACTERISTICS | | | | | | | |
|---|---|---|---|---|---|---|---|
| SOLUTION STABILITY RATING | 5 | 10 | 10 | 10 | 10 | 10 | 5 |
| COLOR IN POT (after one month) | white | opaque yellow | translucent white | light yellow | light yellow | translucent yellowish | translucent yellowish |
| FILM APPEARANCE | opaque white | opaque yellow | translucent white | transparent | transparent | transparent | transparent |
| SUCTION CUP EFFECT, rating from 1 to 10 | 5 | 8 | 8 | 5 | 5 | 5 | 9 |
| CREEP TEST, rating from 1 to 10 | 9 | 9 | 8 | 5 | 5 | 5 | 9 |
| MAXIMUM OPEN TIME, rating from 1 to 10 | 5 | 7 | 8 | 1 | 5 | 6 | 5 |

*Very slight phase separation

TABLE 3

MEASUREMENT OF ADHESIVE STRENGTH

| | EXAMPLES | | | COMPARATIVE EXAMPLES | | | |
|---|---|---|---|---|---|---|---|
| PERFORMANCE | 5 | 6 | 9 | 1 | 2 | 3 | 7 |
| material/material | Shear (daN/cm²) | | | | | | |
| PVC/PVC at 24 hours | 2.7 | 5.4 | x | x | 18.4 | 6.6 | 6.2 |
| PVC/PVC at 7 days | 6.2 | 6.6 | 8.5 | 27 | 23 | 13.9 | x |
| PMMA/PMMA at 2 hours | x | x | x | 6 | x | x | x |
| PMMA/PMMA at 24 hours | 1 | 3.2 | x | x | 9.1 | 9 | x |
| PMMA/PMMA at 7 days | 1.5 | 3.9 | 5 | 10.2 | 15.5 | 7.8 | 7.4 |
| | Peel (daN/cm²) | | | | | | |
| Flexible PVC | 5.6 | 8.8 | | | | | |
| Flexible PVC | 8.1 | 4.3 | | | | | |

| | EXAMPLES | | | COMPARATIVE EXAMPLES | | | |
|---|---|---|---|---|---|---|---|
| PERFORMANCE | 11 | 12 | 16 | 10 | 13 | 14 | 15 |
| material/material | Shear daN/cm² | | | | | | |
| PVC/PVC at 24 hours | x | x | x | 16.6 | 7.7 | 4.7 | 9.4 |
| PVC/PVC at 7 days | 5.5 | 14.2 | 19.1 | 21 | 19.6 | 16.5 | 5.2 |
| PMMA/PMMA at 2 hours | x | x | x | 8.5 | x | x | 4.8 |
| PMMA/PMMA at 24 hours | 6.6 | x | x | x | 7.9 | 7.2 | 4.8 |
| PMMA/PMMA at 7 days | 8.9 | 13.7 | 16 | 10.5 | 5.2 | 5.6 | x |
| | Peel (daN/cm²) | | | | | | |
| Flexible PVC | | | | 1.6 | 5.6 | 8.8 | x |
| Flexible PVC | | | | x | 8.1 | 4.3 | x |

The invention claimed is:

1. An adhesive composition obtainable by mixing:
   100 parts by weight of at least one organic polymer (A) having moisture cross-linkable reactive silane terminal functions, and
   1 to 70 parts by weight of at least one organic polymer (B) comprising no reactive silane functions,
   wherein the organic polymer (B) is miscible at ambient temperature with polymer (A), and comprises a polyester, and
   further wherein the organic polymer (A) comprises:
   (1) at least one homopolymer or copolymer obtainable from:
   at least one alkyl (meth)acrylate monomer comprising an alkyl radical having from 1 to 15 carbon atoms, or monomers comprising styrene derivatives, vinyl ethers, or (meth)acrylic acids;
   (2) at least one polyoxyalkylene of molecular mass ranging from 500 to 30,000 g/mole:
   (3) at least one polyurethane obtainable by condensation of a polyol with a polyisocyanate; or
   (4) a combination thereof.

2. The adhesive composition of claim 1, wherein at least one homopolymer or copolymer (1) is obtainable from monomers comprising styrene derivatives, vinyl ethers, or (meth) acrylic acids, in amounts up to 50% by weight relative to the combined total weight of the monomers comprised by the at least one homopolymer or copolymer.

3. The adhesive composition of claim 1, wherein the at least one polyoxyalkylene (2) comprises a polyoxyethylene or a polyoxypropylene.

4. The adhesive composition of claim 1, wherein the organic polymer (A) comprises at least one hydrolyzable silicon-containing group.

5. The adhesive composition of claim 4, wherein the hydrolyzable silicon-containing group comprises a silyl group of the formula:

$$—Si(R_a)X_{3-a}$$

wherein:
a is an integer ranging from 0 to 2,
R comprises a monovalent hydrocarbon radical and
X comprises a hydrolyzable radical.

6. The adhesive composition of claim 1, wherein the polymer (B) is at least partially crystalline.

7. The adhesive composition of claim 1, wherein the polymer (B) has a mean molecular mass ranging from 500 to 1,000,000 g/mole.

8. The adhesive composition of claim 1, wherein the quantity of polymer (B) ranges from 3 to 50 parts per 100 parts of (A).

9. The adhesive composition of claim 1, wherein the polyoxyalkylene has a molecular mass ranging from 3,000 to 15,000 g/mole.

10. The adhesive composition claim 1, wherein at least one polyurethane is of the polyether or polyester type.

11. The adhesive composition of claim 1, wherein the at least one polyoxyalkylene has a molecular mass ranging from 3,000 to 15,000 g/mole, and the at least one polyurethane is of the polyether or polyester type.

12. The adhesive compound of claim 7, wherein the polymer (B) has a mean molecular mass ranging from 2,000 to 100,000 g/mole.

13. The adhesive composition of claim 12, wherein the polymer (B) has a mean molecular mass ranging from 2,500 to 50,000 g/mole.

14. An adhesive composition comprising:
100 parts by weight of at least one organic polymer (A) having moisture cross-linkable reactive silane terminal functions, and
1 to 70 parts by weight of at least one organic polymer (B) comprising no reactive silane functions,
wherein the organic polymer (B) is a miscible at ambient temperature with polymer (A), and comprises a polyester, and
further wherein the organic polymer (A) comprises:
(1) at least one homopolymer or copolymer obtainable from:
at least one alkyl (meth)acrylate monomer comprising an alkyl radical having from 1 to 15 carbon atoms, or
monomers comprising styrene derivatives, vinyl ethers, or (meth)acrylic acids;
(2) at least one polyoxyalkylene of molecular mass ranging from 500 to 30,000 g/mole;
(3) at least one polyurethane obtainable by condensation of a polyol with a polyisocyanate; or
(4) a combination thereof.

15. An adhesive composition comprising:
100 parts by weight of at least one organic polymer (A) having moisture cross-linkable reactive silane terminal functions, and
1 to 70 parts by weight of at least one organic polymer (B) comprising no reactive silane functions,
wherein the organic polymer (B) is miscible at ambient temperature with polymer (A), and comprises a polyurethane, a polyethylenediimine, a polycarbonate, a polyurea, a polyamide or a mixture thereof,
further wherein the organic polymer (A) comprises:
(1) at least one homopolymer or copolymer obtainable from:
at least one alkyl (meth)acrylate monomer comprising an alkyl radical having from 1 to 15 carbon atoms, or
monomers comprising styrene derivatives, vinyl ethers, or (meth)acrylic acids;
(2) at least one polyoxyalkylene of molecular mass ranging from 500 to 30,000 g/mole;
(3) at least one polyurethane obtainable by condensation of a polyol with a polyisocyanate; or
(4) a combination thereof.

16. The adhesive composition of claim 1, wherein said adhesive composition has a maximum open time rating of 8 or 9.

17. The composition of claim 15, wherein the organic polymer (B) comprises a polyurethane or a polyethylenediimine.

18. The adhesive composition of claim 1, wherein the alkyl radical has from 1 to 10 carbon atoms.

* * * * *